United States Patent [19]
Myhr et al.

[11] 3,765,625
[45] Oct. 16, 1973

[54] METHOD AND APPARATUS FOR RESTORING THE RETRACTIBLE BARRIER OF AN AIRCRAFT ARRESTER

[75] Inventors: Lars Halvar Myhr; Lars-Ake Erling Svensson, both of Norrkoping, Sweden

[73] Assignee: Borgs Fabriks AB, Norrkoping, Sweden

[22] Filed: June 7, 1971

[21] Appl. No.: 150,370

[30] Foreign Application Priority Data
Aug. 28, 1970 Sweden .............................. 7011702

[52] U.S. Cl............................................ 244/110 C
[51] Int. Cl............................................... B64f 1/02
[58] Field of Search................. 244/110, 63, 110 A, 244/110 C, 110 R; 60/51

[56] References Cited
UNITED STATES PATENTS
2,741,445    4/1956    Weyerbacher...................... 244/63
3,205,659    9/1965    Hartzell ................................. 60/51

FOREIGN PATENTS OR APPLICATIONS
1,436,758    3/1966    France ........................... 244/110 R

*Primary Examiner*—Milton Buchler
*Assistant Examiner*—Paul E. Sauberer
*Attorney*—Munson & Fiddler

[57] ABSTRACT

A method and apparatus for retracting the retractible barrier of an aircraft arrester after it has arrested an aircraft and in which a portion of the kinetic energy of the arrested aircraft is stored by means of hydraulic pumps and by hydraulic accumulators or by air compressors and compressed air accumulators and used after arresting the aircraft, to drive hydraulic and pneumatic motors respectively for rewinding the band or line of the arrester and thus restoring the retractible barrier to the arresting position.

2 Claims, 2 Drawing Figures

PATENTED OCT 16 1973          3,765,625

INVENTOR.
LARS HALVAR MYHR, et al

BY
MUNSON & FIDDLER

ATTORNEY

METHOD AND APPARATUS FOR RESTORING THE RETRACTIBLE BARRIER OF AN AIRCRAFT ARRESTER

Background of the Invention.

In the use of retractible barriers for arresting aircraft it is extremely important that the barrier can be restored to its arresting position after it has functioned to arrest an aircraft, so that the apparatus is again operational as quickly as possible.

Restoring the barrier to its operational position has thus far, in the case of rewinding bands or lines forming part of the barrier, required an external supply of energy in the form of electrical power such as obtained from power supply lines or from batteries, hydraulic accumulators or hydraulic units, or by manual energy for example. The need for external energy sources limits to some extent, the repetitive use of the barrier and its location at non-permanent bases.

In arresting an aircraft, which entails the conversion of kinetic energy into thermal energy, large quantities of energy are converted into a different form which has so far not been utilized.

It is thus an object of the present invention to provide a method and means by which part of the kinetic energy is converted into a form that can be stored and sufficient energy can be obtained to rewind and restore the barrier to its arresting position after having arrested an aircraft. Part of the kinetic energy of the aircraft is utilized for restoring the barrier since the kinetic energy is converted into static pressure energy by causing hydraulic pumps or air compressors, for example, to operate during the arresting process and charge accumulators. When the bands or lines of the barrier are rewound, the stored energy is converted into kinetic energy in hydraulic or pneumatic motors which operate to effect the rewinding of the barrier.

Different amounts of energy in the aircraft provide correspondingly different amounts of stored energy, whereby an aircraft arrested with high energy results in a comparatively long length of the band or line being unwound and provides a quantity of stored energy that is sufficient to rewind this length of band.

Since the degree of efficiency in pumps and motors is not one hundred per cent. the number of pumps and motors or their dimensions must be such that sufficient energy is available for rewinding. For example, it is possible to provide an arrangement in such a way that if the pumps and motors have the same performance, the number of pumps will exceed the number of motors. If the pumps and motors are used in combination, it is possible on rewinding to disconnect a number of the pumps so that the number of pumps exceeds the number of motors. If separate pumps and motors are used, the pumps can also be of excess capacity in relation to the motors. The accumulators must be of a capacity sufficient to cope with the longest unwound length of line for which the barrier is designed.

DESCRIPTION.

The invention is shown diagrammatically in the accompanying drawing in which.

Figure 1:
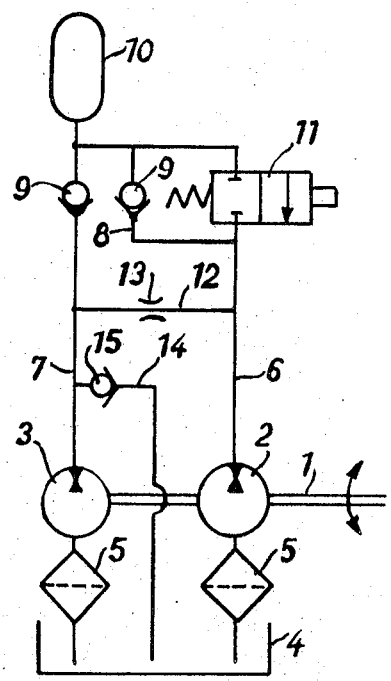
FIG. 1 shows a schematic diagram.

In FIG. 1, 1 designates the shaft of an absorbant, the said shaft being connected to a band magazine (not shown in FIG. 1). When the band magazine is caused to rotate by the band unwinding from the band magazine when arresting an aircraft, it drives by means of the shaft 1, two combined pumps and motors indicated respectively at 2 and 3 and arranged on the shaft 1 which in the present case press out hydraulic fluid from a tank 4 through inlet filters 5 in lines 6, 7 and 8. Through non-return valves 9 the fluid is caused to flow into an accumulator 10.

A control valve 11 is shown in the closed position, that is, the position which it occupies during the arresting process.

When the line or band of the arrester is rewound after having arrested an aircraft, the valve 11 is moved to the open position, causing the fluid under pressure in the accumulator 10 to be forced into the lines 6 and 7 and a line 12 fitted with a constriction point 13, this line connecting the lines 6 and 7 with each other. Elements 2 and 3 will act as motors which, through shaft 1, drive the band magazine around, causing the unwound band to be rewound onto the magazine.

Due to the constriction 13, a high starting torque is obtained which is necessary for accelerating the system, but upon obtaining a certain speed the flow of fluid to the motor 3 becomes restricted, which due to a drop in pressure over constriction 13, supplements the inflow of fluid from tank 4 through a line 14 and non-return valve 15.

Thus, a saving of energy-containing fluid is achieved since the need for it does not arise.

The system is additionally provided with the necessary number of pressure-limiting safety valves and other devices of minor importance for the functional description. For simplicity in illustration, these devices are not shown in FIG. 1.

Figure 2:
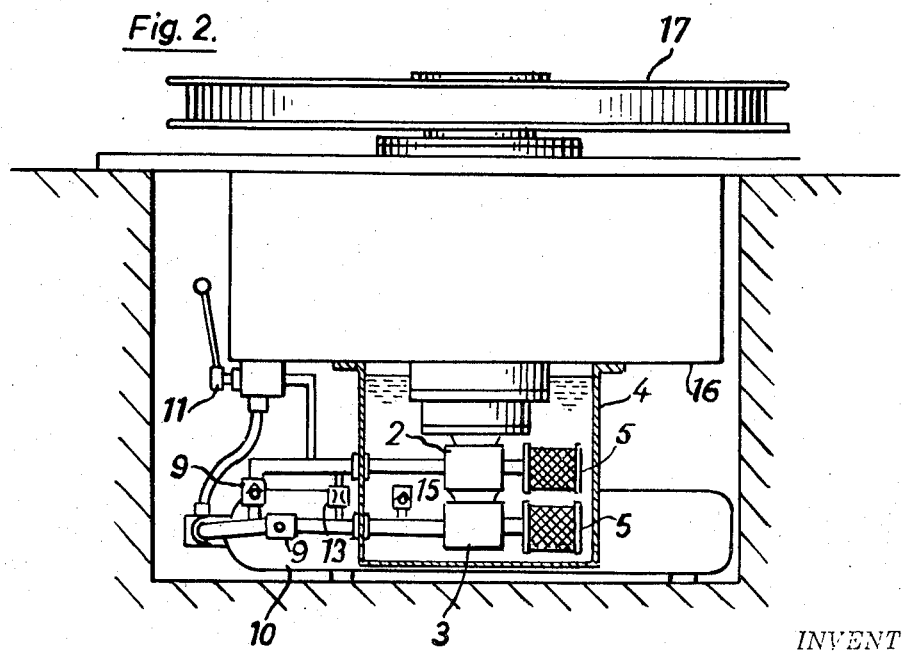
FIG. 2 shows a side view of a rewinding device according to the invention, applied to an absorbant having a band magazine.

In FIG. 2, the numeral designations are the same. The absorbant 16 and band magazine 17 are shown in FIG. 2.

The hydraulic system can, in accordance with the invention, be replaced by a pneumatic system using compressors and in which case the tank 4 will not be required.

From the foregoing it will be apparent that we have herein shown and described an arrangement and a method of using it by which the kinetic energy of the arrested aircraft may be stored and then used to drive hydraulic and pneumatic means to very effectively restore an aircraft barrier to an arresting position. The advantages of such an arrangement will be apparent to those skilled in this art .

What is claimed is:

1. In an aircraft arresting system a device for restoring the barrier means to aircraft arresting position after completion of the arresting operation comprising:

a. torque absorbing means from which the barrier means are unwound during the arresting operation and rewound thereon upon completion of the arresting operation;

b. at least two compression means connected to said torque absorbing means and being alternately effective to pump pressure fluid to accumulator means for storing the energy produced by the unwinding operation and to drive said torque absorbing means to rewind said barrier means upon release of the stored energy;

c. first passage means for individually connecting said compression means to said accumulator means and to a source of high pressure fluid;
d. valve means in said first passage means effective to reverse the flow of pressure fluid to and from said accumulator means;
e. an interconnecting passage having a constricted portion between said first passage means to provide flow of pressure fluid from said accumulator means during the rewinding operation, and
f. separate valve controlled passage means effective to supply pressure fluid directly from the fluid source to one of said compression means.

2. In an aircraft arresting system the method of rewinding the barrier means on the torque absorbing means, which comprises:

a. utilizing the energy developed by the aircraft upon engagement with and unwinding of the barrier means for driving a plurality of compression means to alternately pump pressure fluid to accumulator means to store the energy therein and to energize the compression means upon release of the stored energy to drive the torque absorbing means;
b. passing a restricted flow of the released pressure fluid through a constricted passage to one of the compression means, and
c. passing additional pressure fluid for a limited period of time from a separate source to the compression means receiving the restricted flow so as to supply added torque required for starting the rewinding operation.

* * * * *